US012757308B2

(12) United States Patent
Hur

(10) Patent No.: US 12,757,308 B2
(45) Date of Patent: Oct. 6, 2026

(54) APPARATUS AND METHOD FOR CONTROLLING VEHICLE INTERIOR LIGHTING

(71) Applicant: HYUNDAI MOBIS CO., LTD., Seoul (KR)

(72) Inventor: Woon Bong Hur, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 85 days.

(21) Appl. No.: 18/957,989

(22) Filed: Nov. 25, 2024

(65) Prior Publication Data

US 2025/0324501 A1 Oct. 16, 2025

(30) Foreign Application Priority Data

Apr. 12, 2024 (KR) ........................ 10-2024-0049388

(51) Int. Cl.

*H05B 47/175* (2020.01)
*B60Q 3/70* (2017.01)
*G06T 7/90* (2017.01)

(52) U.S. Cl.

CPC ............. *H05B 47/196* (2024.01); *B60Q 3/70* (2017.02); *G06T 7/90* (2017.01); *B60Q 2500/00* (2013.01); *G06T 2207/10024* (2013.01); *G06T 2207/20021* (2013.01)

(58) Field of Classification Search

CPC .... H05B 47/196; B60Q 3/70; B60Q 2500/00; B60Q 3/80; B60Q 3/78; B60Q 2900/30; G06T 7/90; G06T 2207/10024; G06T 2207/20021

See application file for complete search history.

(56) References Cited

U.S. PATENT DOCUMENTS

2018/0130445 A1* 5/2018 Dazé ........................ G09G 5/02

FOREIGN PATENT DOCUMENTS

DE 102023203063 A1 * 10/2024 ........... B60R 16/037
KR 102100979 B1 * 4/2020 ................ F21V 9/40

* cited by examiner

*Primary Examiner* — Abdullah A Riyami
*Assistant Examiner* — Syed M Kaiser
(74) *Attorney, Agent, or Firm* — NovoTechIP International PLLC

(57) ABSTRACT

Disclosed are an apparatus and a method for controlling vehicle interior lighting. The apparatus for controlling vehicle interior lighting according to an aspect of the present disclosure includes: a first communication module configured to communicate with a display device installed in a vehicle interior; a lighting module configured to include a plurality of light sources; and a processor connected to the first communication module and the lighting module, wherein the processor is configured to: receive first image information, which is information on an image being output on the display device, through the first communication module; generate first color information based on the first image information; and control the lighting module based on the first color information.

16 Claims, 10 Drawing Sheets

APPARATUS AND METHOD FOR CONTROLLING VEHICLE INTERIOR LIGHTING

CROSS-REFERENCE TO RELATED APPLICATIONS

This application claims priority from and the benefit of Korean Patent Application No. 10-2024-0049388, filed on Apr. 12, 2024, which is hereby incorporated by reference for all purposes as if set forth herein.

TECHNICAL FIELD

Exemplary embodiments of the present disclosure relate to an apparatus and a method for controlling vehicle interior lighting.

BACKGROUND

An electric vehicle takes a significant amount of time to charge. While the electric vehicle charges, most people spend time watching videos on a display device or mobile device installed in the vehicle. As the use of electric vehicles becomes more widespread, the number of people watching videos on the display device or mobile device within the vehicle has increased.

As a result, technologies have been developed to enhance people's immersion in videos output through the in-vehicle display device or mobile device. However, conventional technologies only provide the automatic adjustment of the brightness of lighting in the vehicle, and fail to fully utilize various lighting devices installed in the vehicle.

The related art of the present disclosure is disclosed in Korean Patent No. 10-2100979 (published on Apr. 8, 2020).

SUMMARY

According to an aspect of the present disclosure, there are provided an apparatus and a method for controlling vehicle interior lighting, which may control vehicle interior lighting to correspond to an image output on a display device or mobile device, thereby enhancing a user's immersion in the image output on the display device or mobile device.

An apparatus for controlling vehicle interior lighting according to an aspect of the present disclosure includes: a first communication module configured to communicate with a display device installed in a vehicle interior; a lighting module configured to include a plurality of light sources; and a processor connected to the first communication module and the lighting module, wherein the processor is configured to: receive first image information, which is information on an image being output on the display device, through the first communication module; generate first color information based on the first image information; and control the lighting module based on the first color information.

In the present disclosure, the lighting module outputs ambient light.

In the present disclosure, the processor the processor is configured to: sample the first image information to extract a first frame; divide the first frame into a plurality of areas; determine a representative color for each of the plurality of areas; and generate the first color information by including the representative color for each of the plurality of areas.

In the present disclosure, the processor wherein the processor is configured to: detect a color value at each of n randomly selected points from the areas; calculate a median value for the color values at each of the n points; and use a color corresponding to the median value as a representative color for the areas.

In the present disclosure, the processor the processor is configured to: identify an area corresponding to each of the plurality of light sources based on a location of the display device and a location of each of the plurality of light sources; and control the lighting module such that each of the plurality of light sources outputs light of the representative color of the area corresponding to each of the plurality of light sources.

In the present disclosure, the processor is configured to: identify at least one light source, out of the plurality of light sources, corresponding to a location of a user; and control the at least one identified light source based on the first color information.

The apparatus for controlling vehicle interior lighting according to an aspect of the present disclosure further includes a second communication module configured to communicate with a mobile device located in the vehicle interior, wherein the processor is configured to: receive second image information, which is information on an image being output on the mobile device, through the second communication module; generate second color information based on the second image information; and control the lighting module based on the second color information.

In the present disclosure, the processor is configured to: sample the second image information to extract a second frame; divide the second frame into a plurality of areas; determine a representative color for each of the plurality of areas; and generate the second color information by including the representative color for each of the plurality of areas.

In the present disclosure, the processor is configured to: identify an area corresponding to each of the plurality of light sources based on a location of the mobile device and a location of each of the plurality of light sources; and control the lighting module such that each of the plurality of light sources outputs light of the representative color of the area corresponding to each of the plurality of light sources.

A method for controlling vehicle interior lighting, performed in a computing device including a processor, includes: receiving first image information, which is information on an image being output on a display device installed in an interior of a vehicle; generating first color information based on the first image information; and controlling a lighting module including a plurality of light sources, based on the first color information.

According to an aspect of the present disclosure, the present disclosure may control vehicle interior lighting to correspond to an image output on the display device or mobile device, thereby enhancing the user's immersion in the image output on the display device or mobile device.

DETAILED DESCRIPTION

Figure 1:
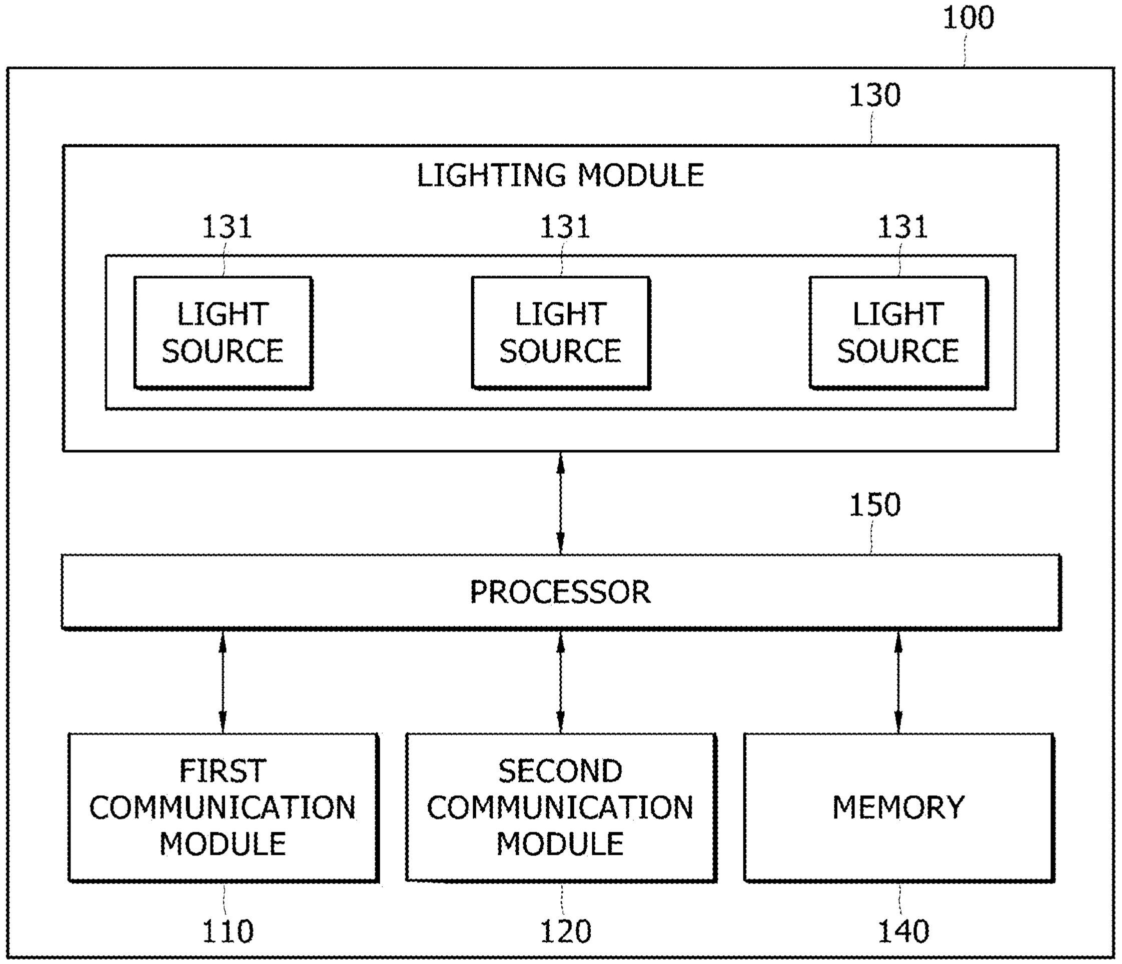
FIG. 1 is a block diagram showing an apparatus for controlling vehicle interior lighting according to embodiments of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

FIG. 1 is a block diagram showing an apparatus for controlling vehicle interior lighting according to embodiments of the present disclosure.

Referring to FIG. 1, an apparatus for controlling vehicle interior lighting 100 according to embodiments of the present disclosure may include a first communication module 110, a second communication module 120, a lighting module 130, a memory 140, and a processor 150. Each of the components included in the apparatus for controlling vehicle interior lighting 100 according to embodiments of the present disclosure may be connected via (or through) a common bus, or may be connected through an individual interface or an individual bus centered on the processor 150. The apparatus for controlling vehicle interior lighting 100 according to embodiments of the present disclosure may further include various other components in addition to the components illustrated in FIG. 1, or may not include some of the components illustrated in FIG. 1.

The first communication module 110 may perform communication with a display device disposed (or installed) in a vehicle. The first communication module 110 may perform communication with the display device by using various types of communication methods. The display device is a device that includes a display for outputting an image, and may include a navigation system. The first communication module 110 may perform communication with the display device, for example, by using a wired communication. However, the communication method of the first communication module 110 is not limited to the embodiments described above, and the first communication module 110 may perform communication with the display device by using a variety of known communication methods.

The second communication module 120 may perform communication with a mobile device located within the vehicle. The second communication module 120 may perform communication with the mobile device by using various types of communication methods. The mobile device is a device that includes a display for outputting an image, and may include a variety of wireless electronic devices, such as a smartphone, tablet, and laptop. The second communication module 120 may perform communication with the mobile device by using, for example, Wi-Fi Direct technology. However, the communication method of the second communication module 120 is not limited to the embodiments described above, and the second communication module 120 may perform communication with the mobile device by using a variety of known wireless communication methods.

The lighting module 130 may illuminate a vehicle interior with light. The lighting module 130 may include a plurality of light sources 131. Each of the light sources 131 may be disposed or installed at different locations in the vehicle. The light sources 131 may illuminate the interior of the vehicle with various colors of light. The colors of the light output by the plurality of light sources 131 may be different from each other. For example, the lighting module 130 may output ambient light.

The memory 140 may store at least one instruction executed by the processor 150. The memory 140 may be implemented as a volatile storage medium and/or a non-volatile storage medium, for example, as read-only memory (ROM) and/or random access memory (RAM). The memory 140 may store various information required during the operation of the processor 150. In addition, the memory 140 may store various information generated during the operation of the processor 150.

The processor 150 may be operatively connected to the first communication module 110, the second communication module 120, the lighting module 130, and the memory 140. The processor 150 may be implemented in a central processing unit (CPU) or a system on chip (SoC), may run an operating system or an application to control a plurality of hardware or software components connected to the processor 150, and may perform various data processing and computations. The processor 150 may be configured to execute at least one instruction stored in the memory 140 and to store the resulting data in the memory 140.

The processor 150 may receive first image information, which is information on an image being output on the display device, via (or through) the first communication module 110, generate first color information based on the first image information, and control the lighting module 130 based on the first color information. The present embodiment may change the output color of the light sources in the vehicle in response to the image being output on the display device, thereby enhancing a user's immersion in the image being output on the display device.

The processor 150 may receive second image information, which is information on an image being output on the mobile device, via (or through) the second communication module 120, generate second color information based on the second image information, and control the lighting module 130 based on the second color information. The present embodiment may change the output color of the light sources in the vehicle in response to the image being output on the mobile device, thereby enhancing a user's immersion in the image being output on the mobile device.

Figure 2:
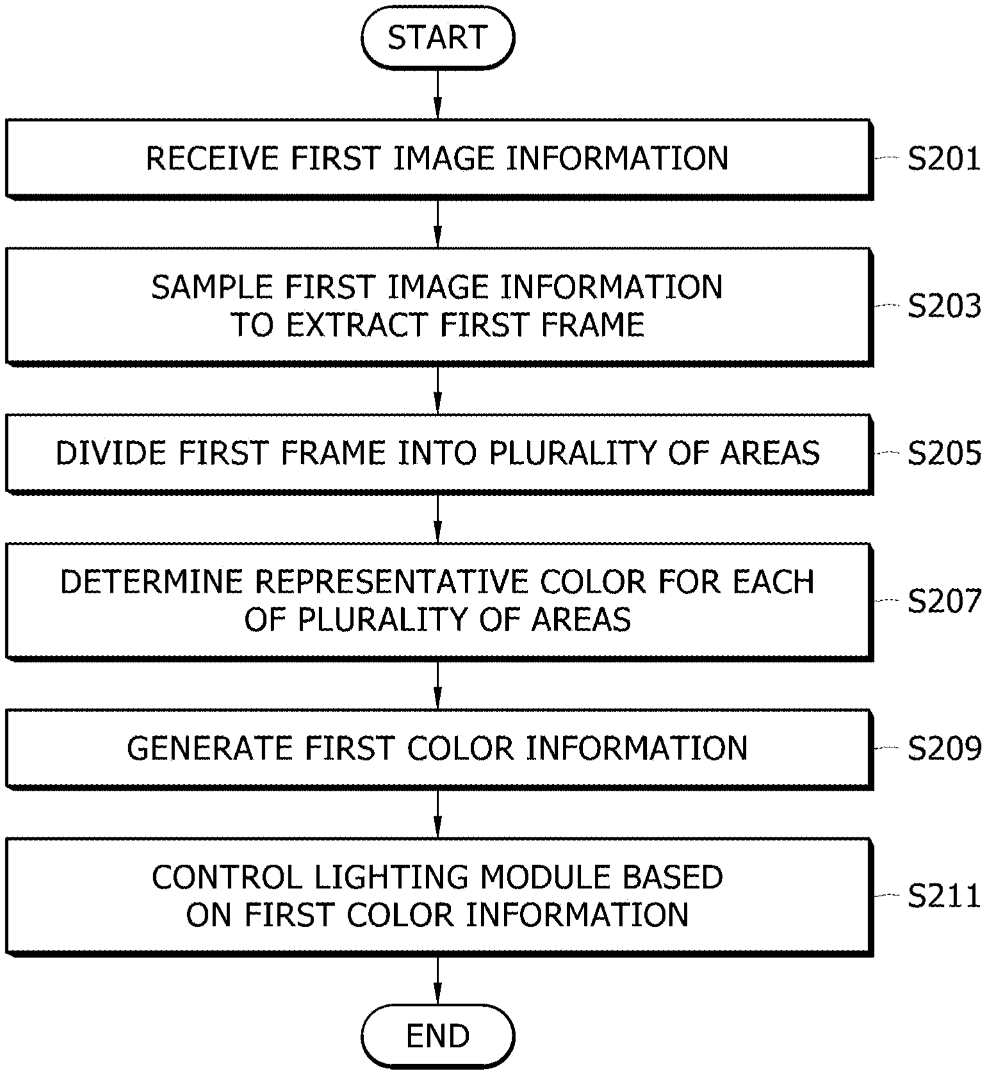
FIG. 2 is a first flowchart showing a method for controlling vehicle interior lighting according to embodiments of the present disclosure.
Figure 3A:
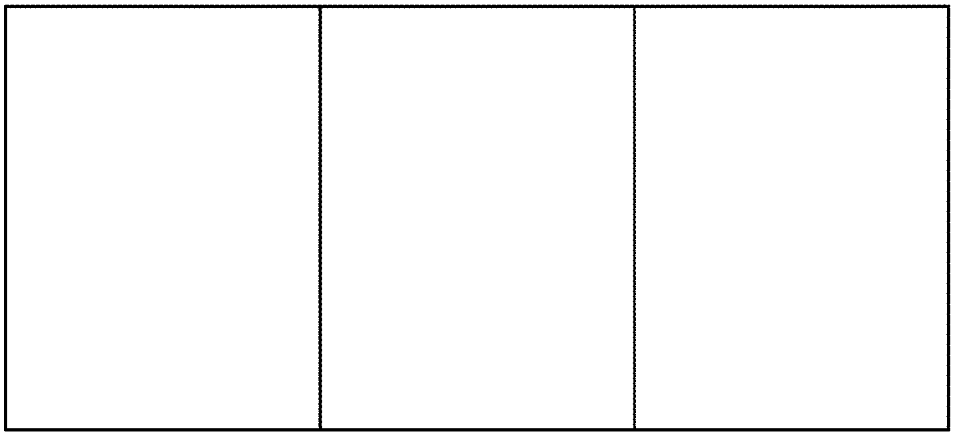
FIGS. 3A and 3B are example views illustrating a method of dividing a frame into a plurality of areas.
Figure 3B:
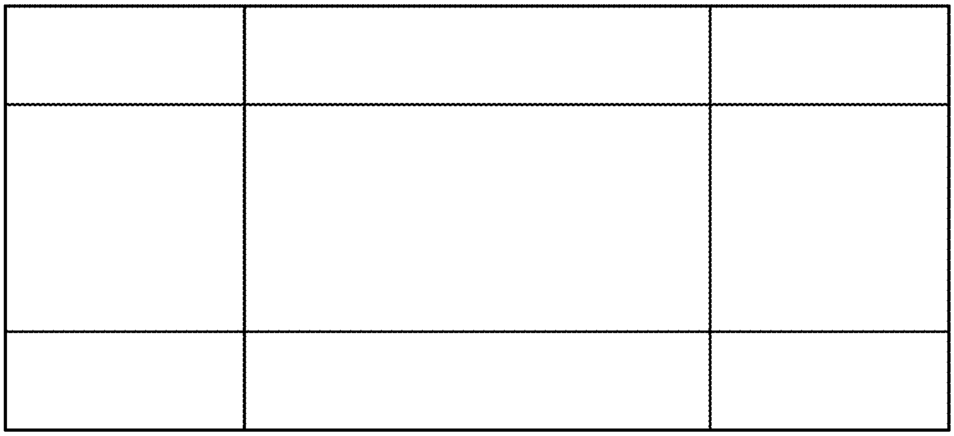
Figure 4:
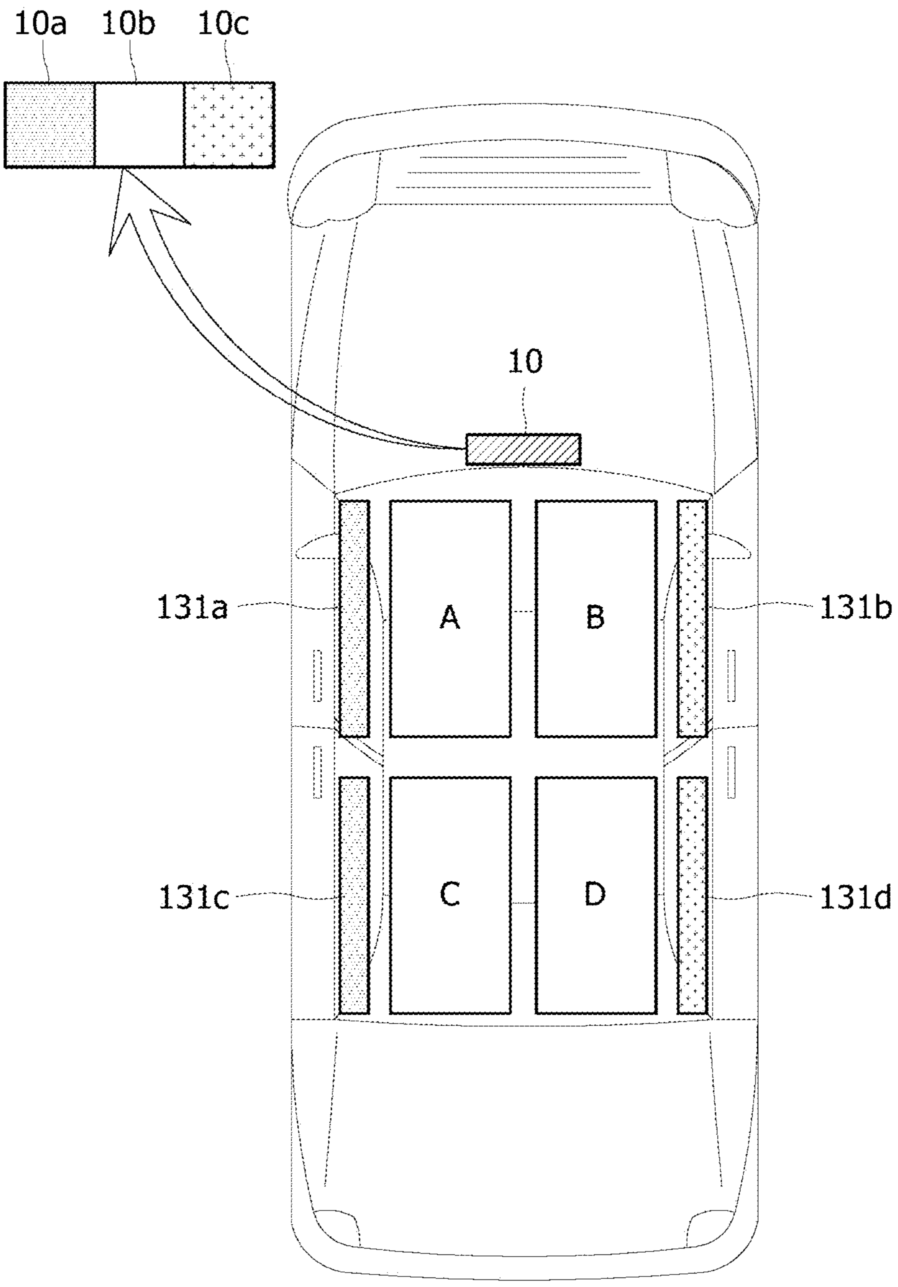
FIGS. 4 and 5 are example views showing the results of controlling a lighting module.
Figure 5:
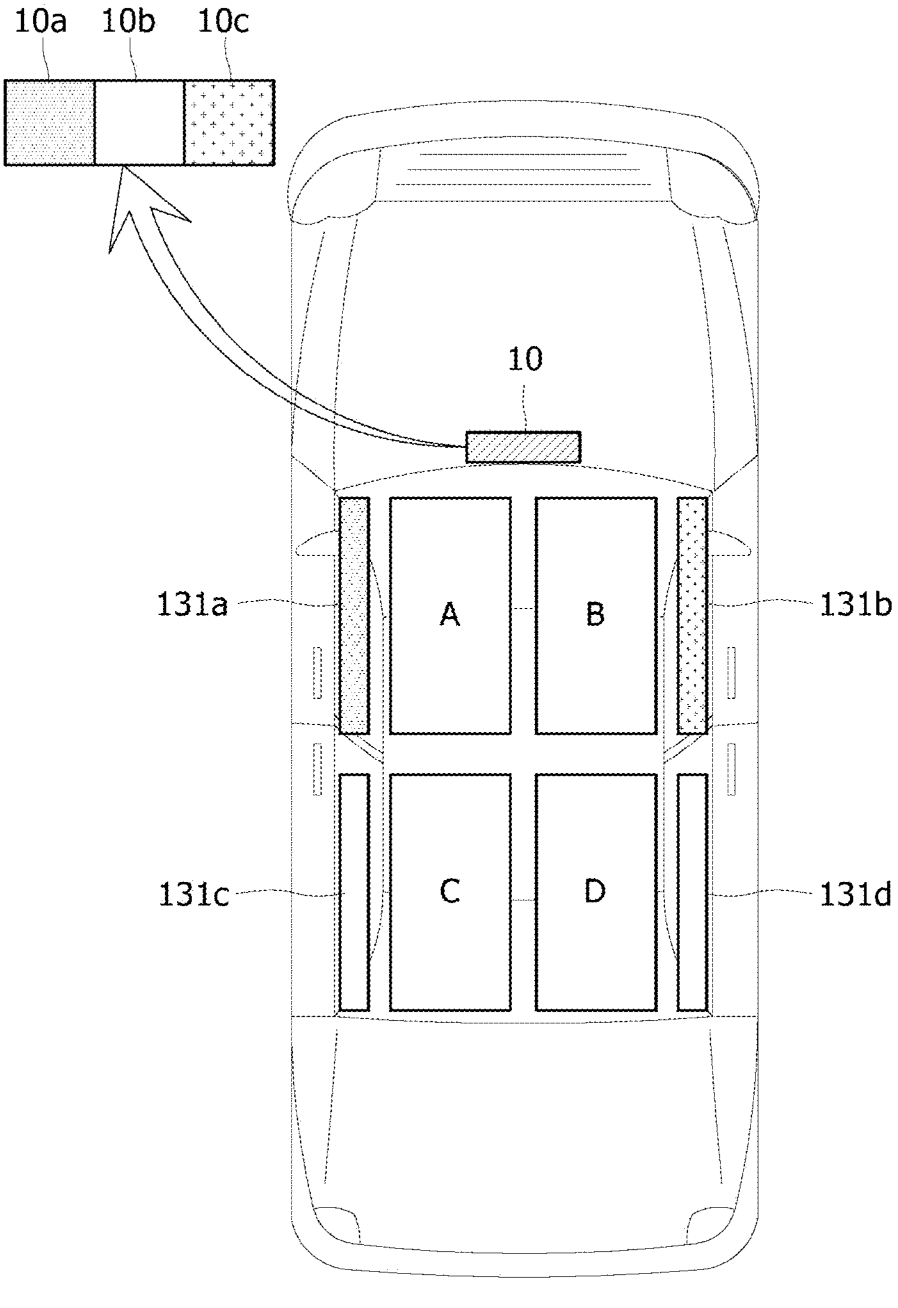

FIG. 2 is a first flowchart showing a method for controlling vehicle interior lighting according to embodiments of the present disclosure. FIGS. 3A and 3B are example views illustrating a method of dividing a frame into a plurality of areas. FIGS. 4 and 5 are example views showing the results of controlling a lighting module.

Referring to FIG. 2, a method for controlling the lighting module 130 depending on the image being output on the display device, will be described below, with a focus on an operation of the processor 150. Some of the steps described below may be performed in a different order than the order described below, or may be omitted.

First, the processor 150 may receive first image information, which is information on an image being output on the display device, via or through the first communication module 110 (S201). The first image information may include color information, for each area, on the image being output on the display device. In various embodiments, the processor 150 may receive information on only some areas (e.g., edge areas) of the image being output on the display device.

Next, the processor 150 may sample the first image information to extract a first frame (S203). The first frame may refer to an image being output on the display device at a specific point in time. In step S203, the processor 150 may perform sampling at a predetermined set interval. The set interval may be changed depending on the interior illuminance of the vehicle. To this end, the apparatus for controlling vehicle interior lighting 100 may further include an illuminance sensor configured to detect the interior illuminance of the vehicle. Relationship information on the interval depending on the interior illuminance may be preset and stored in the memory 140, and the processor 150 may detect the interval corresponding to a current interior illuminance from the relationship information stored in the memory 140, and set the detected interval as a set interval. The interval at which the light sources 131 change colors may be changed depending on the set interval.

Next, the processor 150 may divide the first frame into a plurality of areas (S205). As illustrated in FIG. 3A, the processor 150 may divide the first frame into three areas. In various embodiments, as illustrated in FIG. 3B, the processor 150 may divide the first frame into nine areas. However, the manner in which the first frame is divided into a plurality of areas is not limited to the embodiments described above, and the first frame may be divided in a variety of manners. The size and number of the plurality of areas may be set by considering the number of the light sources 131, the location of the light sources 131, and the like.

Next, the processor 150 may determine a representative color for each of the plurality of areas (S207). In various embodiments, the processor 150 may determine representative colors for only some areas (e.g., edge areas) out of the plurality of areas. For example, if the first frame is divided as shown in FIG. 3A, the processor 150 may determine representative colors for the left and right areas and not determine a representative color for the central area.

Next, the processor 150 may generate the first color information by including the representative color for each of the plurality of areas (S209). In step S209, the processor 150 may generate the first color information by integrating information on the representative colors determined in step S207.

Next, the processor 150 may control the lighting module 130 based on the first color information (S211). In step S211, the processor 150 may identify a representative color of the area corresponding to each of the plurality of light sources 131 by using the first color information, and may control the lighting module 130 such that each of the plurality of light sources 131 outputs light having the representative color of the area corresponding to each of the plurality of light sources 131. For example, as illustrated in FIG. 4, assuming that the representative color of a first area 10*a* is a first color and the representative color of a second area 10*c* is a second color, the processor 150 may change the color of a first light source 131*a* and a third light source 131*c*, which are the light sources corresponding to the first area 10*a*, into the first color, and change the color of a second light source 131*b* and a fourth light source 131*d*, which are the light sources corresponding to the second area 10*c*, into the second color.

In this case, the processor 150 may determine a location of a user, identify at least one light source 131, out of the plurality of light sources 131, corresponding to the location of the user, and control only the at least one identified light source 131. The processor 150 may receive information on the location of the user from various sensors and systems provided in the vehicle. For example, the processor 150 may receive information on the location of the user from an airbag system. To this end, the apparatus for controlling vehicle interior lighting 100 may include a separate communication module (third communication module) for communicating with sensors and/or systems in the vehicle.

In the present embodiment, the light source corresponding to the location of the user may refer to a light source of which the output light (or color of light) is detected in the user's field of view. For example, as illustrated in FIG. 5, assuming that the representative color of the first area 10*a* is a first color, the representative color of the second area 10*c* is a second color, and the user is located in a driver's seat A, the processor 150 may only change the colors of the first light source 131*a* and the second light source 131*b*, which are light sources that are detected in the driver's seat A, and not change the colors of the third light source 131*c* and the fourth light source 131*d*, which are light sources that are not detected in the driver's seat A, thereby reducing unnecessary power consumption.

Figure 6:
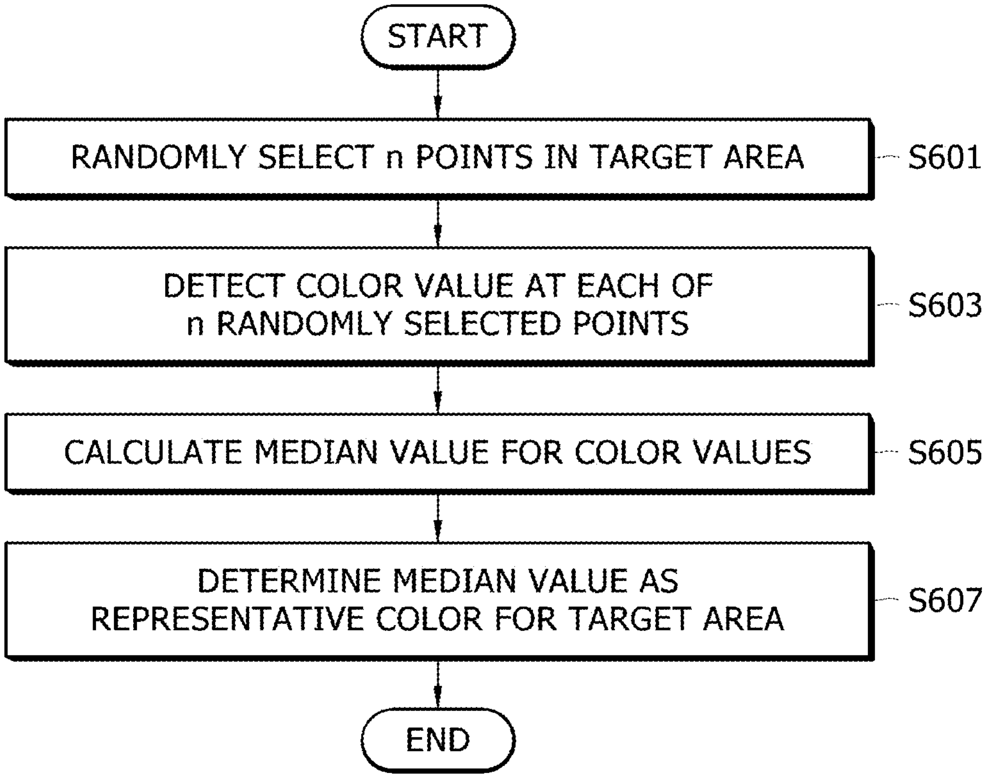
FIG. 6 is a flowchart showing a method of determining a representative color for a random area.
Figure 7:
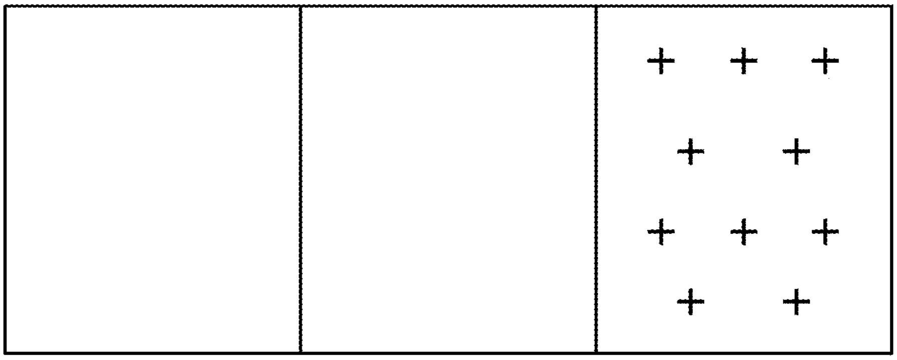
FIG. 7 is an example view showing the result of selecting points in an area.

FIG. 6 is a flowchart showing a method of determining a representative color for a random area. FIG. 7 is an example view showing the result of selecting points in an area.

Referring to FIG. 6, a method for determining a representative color for a random area will be described below, with a focus on an operation of the processor 150. Some of the steps described below may be performed in a different order than the order described below, or may be omitted. The processor 150 may perform the process in FIG. 6 for each of the plurality of areas.

First, the processor 150 may randomly select a number (n) of points in an area for which a representative color is to be determined (hereinafter the target area) (S601). For example, assuming that the target area is the right area and n is 10, the processor 150 may select points as illustrated in FIG. 7. n may be pre-set to a suitable value.

Next, the processor 150 may detect a color value at each of the number (n) of the randomly selected points (S603). In the present embodiment, a color value may refer to an RGB value. The processor 150 may calculate a difference between a color value detected from a previous frame and a color value detected from a current frame, and may change a set interval (sampling interval) based on the calculated difference. The processor 150 may decrease the set interval as the difference between the color value detected from the previous frame and the color value detected from the current frame becomes greater.

Next, the processor 150 may calculate a median value for the color values detected in step S603 (S605), and determine a color corresponding to the calculated median value as a representative color for the target area (S607). In various embodiments, the processor 150 may utilize an average value, a maximum value, or a minimum value instead of a median value. The processor 150 may receive user input regarding which value to use among the median, average, maximum, and minimum values, and may determine which value to use based on the received user input.

Figure 8:
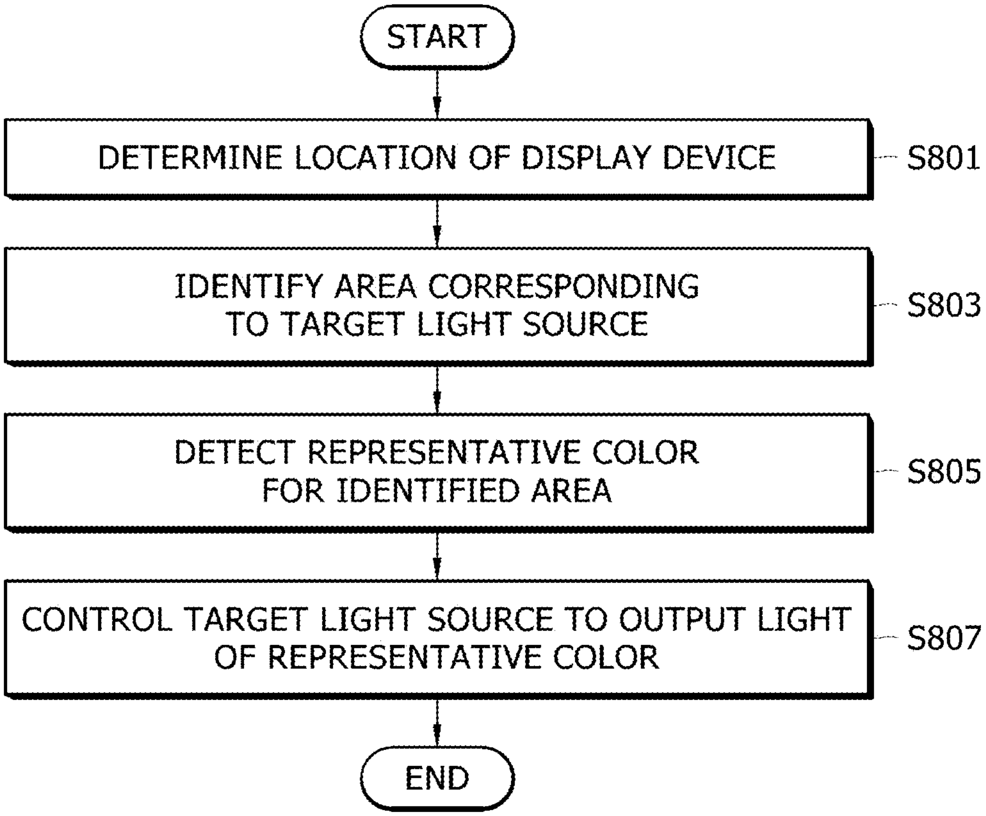
FIG. 8 is a flowchart showing a method of controlling a light source based on first color information.

FIG. 8 is a flowchart showing a method of controlling a light source based on first color information.

Referring to FIG. 8, a method for controlling the light sources 131 based on the first color information will be described below, with a focus on an operation of the processor 150. Some of the steps described below may be performed in a different order than the order described below, or may be omitted. The processor 150 may perform the process in FIG. 8 for each of the plurality of light sources 131 included in the lighting module 130.

First, the processor 150 may determine a location of the display device (S801). Information on the location of the display device may be pre-stored in the memory 140, and the processor 150 may determine the location of the display device from the memory 140.

Next, based on the location of the display device and the location of a light source to be controlled (hereinafter the target light source), the processor 150 may identify an area corresponding to the target light source among the plurality of areas constituting the first frame (S803). Information on the location of each of the light sources 131 may be pre-stored in the memory 140, and the processor 150 may determine the location of the target light source from the memory 140. In step S803, the processor 150 may identify an area closest to the target light source as the area corresponding to the target light source. Mapping information in which the relationship information on the corresponding area depending on the location of the light sources 131 is set for each location of the display device may be pre-stored in the memory 140, and the processor 150 may identify the area corresponding to the target light source by using the mapping information.

However, the method of identifying the area corresponding to the target light source is not limited to the embodiments described above, and the processor 150 may identify the area corresponding to the target light source by using various methods, by considering the locations of both the display device and the target light source. There may be one or more light sources 131 corresponding to the area.

Next, the processor 150 may detect a representative color for the area identified in step S803 from the first color information (S805). Information on representative colors for each area may have been recorded in the first color information, and the processor 150 may detect a representative color for the area corresponding to the target light source from the first color information.

Next, the processor 150 may control the target light source to output light having the representative color detected in step S805 (S807).

Figure 9:
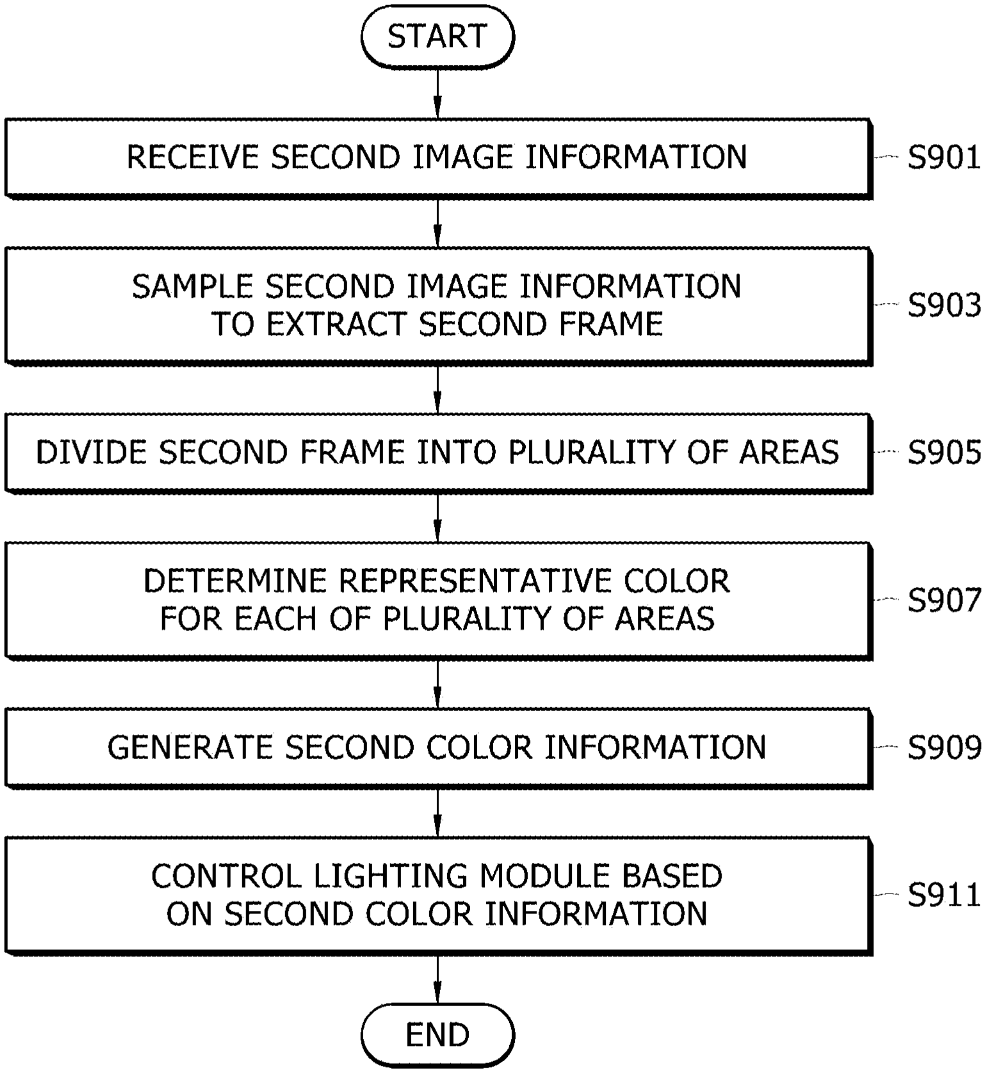
FIG. 9 is a second flowchart showing a method for controlling vehicle interior lighting according to embodiments of the present disclosure.

FIG. 9 is a second flowchart showing a method for controlling vehicle interior lighting according to embodiments of the present disclosure.

Referring to FIG. 9, a method for controlling the lighting module 130 depending on the image being output on the mobile device, will be described below, with a focus on an operation of the processor 150. Some of the steps described below may be performed in a different order than the order described below, or may be omitted.

First, the processor 150 may receive second image information, which is information on an image being output on the mobile device, via or through the second communication module 120 (S901). The second image information may include color information for each area on the image being output on the mobile device. In various embodiments, the processor 150 may receive information on only some areas (e.g., edge areas) of the image being output on the mobile device.

Next, the processor 150 may sample the second image information to extract a second frame (S903). The second frame may refer to an image being output on the mobile device at a specific point in time. In step S903, the processor 150 may perform sampling at a predetermined set interval. The set interval may be changed depending on the interior illuminance of the vehicle.

Next, the processor 150 may divide the second frame into a plurality of areas (S905). The size and number of the plurality of areas may be set by considering the number of the light sources 131, the location of the light sources 131, and the like.

Next, the processor 150 may determine a representative color for each of the plurality of areas (S907). In various embodiments, the processor 150 may determine representative colors for only some areas (e.g., edge areas) out of the plurality of areas.

Next, the processor 150 may generate the second color information by including the representative color for each of the plurality of areas (S909). In step S909, the processor 150 may generate the second color information by integrating information on the representative colors determined in step S907.

Next, the processor 150 may control the lighting module 130 based on the second color information (S911). In step S911, the processor 150 may identify a representative color of the area corresponding to each of the plurality of light sources 131 by using the second color information, and may control the lighting module 130 such that each of the plurality of light sources 131 outputs light having the representative color of the area corresponding to each of the plurality of light sources 131.

In this case, the processor 150 may determine a location of a user, identify at least one light source 131, out of the plurality of light sources 131, corresponding to the location of the user, and control only the at least one identified light source 131. In the present embodiment, the light source corresponding to the location of the user may refer to a light source of which the output light is detected in the user's field of view.

Figure 10:
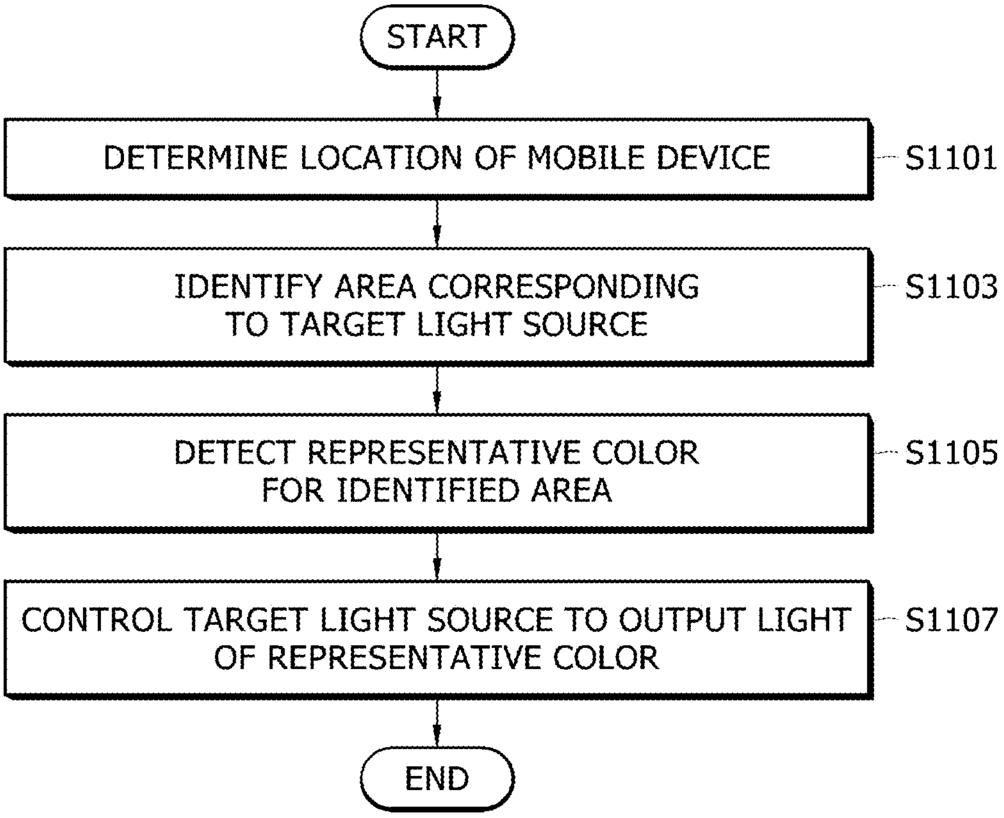
FIG. 10 is a flowchart showing a method of controlling a light source based on second color information.

FIG. 10 is a flowchart showing a method of controlling a light source based on second color information.

Referring to FIG. 10, a method for controlling the light sources 131 based on the second color information will be described below, with a focus on an operation of the processor 150. Some of the steps described below may be performed in a different order than the order described below, or may be omitted. The processor 150 may perform the process in FIG. 10 for each of the plurality of light sources 131 included in the lighting module 130.

Next, the processor 150 may determine a location of the mobile device (S1001). The apparatus for controlling vehicle interior lighting 100 may include a capture module (e.g., a camera), and the processor 150 may determine a location of the mobile device based on the image captured by the capture module.

Next, based on the location of the mobile device and the location of a light source to be controlled (hereinafter the target light source), the processor 150 may identify an area corresponding to the target light source among the plurality of areas constituting the second frame (S1003). In step S1003, the processor 150 may identify an area closest to the target light source as the area corresponding to the target light source. Mapping information in which the relationship information on the corresponding area depending on the location of the light sources 131 is set for each location of the mobile device may be pre-stored in the memory 140, and the processor 150 may identify the area corresponding to the target light source by using the mapping information.

Next, the processor 150 may detect a representative color for the area identified in step S1003 from the second color information (S1005). Information on representative colors for each area may have been recorded in the second color information, and the processor 150 may detect a representative color for the area corresponding to the target light source from the second color information.

Next, the processor 150 may control the target light source to output light having the representative color detected in step S1005 (S1007).

As described above, the apparatus and the method for controlling vehicle interior lighting according to embodiments of the present disclosure may control vehicle interior lighting to correspond to an image output on the display device or mobile device, thereby enhancing the user's immersion in the image output on the display device or mobile device.

What is claimed is:

1. An apparatus for controlling vehicle interior lighting, comprising:
- a first communication module configured to communicate with a display device disposed at an interior of a vehicle;
- a second communication module configured to communicate with a mobile device located at the interior of the vehicle;
- a lighting module comprising a plurality of light sources; and
- a processor connected to the first communication module and the lighting module and configured to:
  - receive, via the first communication module, first image information including information on a first image displayed on the display device;
  - generate first color information based on the first image information; and
  - control the lighting module based on the first color information,
- wherein the processor is connected to the second communication module and further configured to:
  - receive, via the second communication module, second image information including information on a second image displayed on the mobile device;
  - generate second color information based on the second image information; and
  - control the lighting module based on the second color information.

2. The apparatus of claim 1, wherein the lighting module is configured to output ambient light.

3. The apparatus of claim 1, wherein, to generate the first color information, the processor is further configured to:
- sample the first image information to extract a first frame;
- divide the first frame into a plurality of areas;
- determine a representative color for each of the plurality of areas; and
- generate the first color information by including the representative color for each of the plurality of areas.

4. The apparatus of claim 3, wherein the processor is configured to:
- identify an area corresponding to each of the plurality of light sources based on a location of the display device and a location of each of the plurality of light sources; and
- control the lighting module such that each of the plurality of light sources outputs light having the representative color of the area corresponding to each of the plurality of light sources.

5. The apparatus of claim 1, wherein the processor is further configured to:
- identify, from the plurality of light sources, at least one light source corresponding to a location of a user; and
- control the at least one light source identified based on the first color information.

6. The apparatus of claim 1, wherein, to generate the second color information, the processor is configured to:
- sample the second image information to extract a second frame;
- divide the second frame into a plurality of areas;
- determine a representative color for each of the plurality of areas; and
- generate the second color information by including the representative color for each of the plurality of areas.

7. The apparatus of claim 6, wherein the processor is further configured to:
- identify an area corresponding to each of the plurality of light sources based on a location of the mobile device and a location of each of the plurality of light sources; and control the lighting module such that each of the plurality of light sources outputs light having the representative color of the area corresponding to each of the plurality of light sources.

8. An apparatus for controlling vehicle interior lighting, comprising:

a first communication module configured to communicate with a display device disposed at an interior of a vehicle;

a lighting module comprising a plurality of light sources; and a processor connected to the first communication module and the lighting module and configured to:

receive, via the first communication module, first image information including information on an image displayed on the display device;

generate first color information based on the first image information; and control the lighting module based on the first color information, wherein, to generate the first color information, the processor is further configured to:

sample the first image information to extract a first frame;

divide the first frame into a plurality of areas;

determine a representative color for each of the plurality of areas; and generate the first color information by including the representative color for each of the plurality of areas, and wherein, to determine the representative color for each of the plurality of areas, the processor is further configured to:

detect a color value at each of a randomly selected number of points from the plurality of areas;

calculate a median value for the color value at each of the randomly selected number of points; and use a color corresponding to the median value as the representative color for each of the plurality of areas.

9. A method for controlling vehicle interior lighting, comprising:

receiving first image information including information on a first image displayed on a display device disposed at an interior of a vehicle;

generating first color information based on the first image information;

controlling, based on the first color information, a lighting module comprising a plurality of light sources;

receiving second image information including information on a second image displayed on a mobile device located at the interior of the vehicle;

generating second color information based on the second image information; and controlling, based on the second color information, the lighting module.

10. The method of claim 9, wherein controlling, based on the first image information, the lighting module and controlling, based on the second image information, the lighting module comprise controlling the lighting module to output ambient light.

11. The method of claim 9, wherein generating the first color information comprises:

sampling the first image information to extract a first frame;

dividing the first frame into a plurality of areas;

determining a representative color for each of the plurality of areas; and generating the first color information by including the representative color for each of the plurality of areas.

12. The method of claim 11, wherein determining the representative color for each of the plurality of areas comprises:

detecting a color value at each of a randomly selected number of points from the plurality of areas;

calculating a median value for the color value at each of the randomly selected number of points; and using a color corresponding to the median value as the representative color for each of the plurality of areas.

13. The method of claim 11, further comprising:

identifying an area corresponding to each of the plurality of light sources based on a location of the display device and a location of each of the plurality of light sources; and controlling the lighting module such that each of the plurality of light sources outputs light having the representative color of the area corresponding to each of the plurality of light sources.

14. The method of claim 9, further comprising:

identifying, from the plurality of light sources, at least one light source corresponding to a location of a user; and controlling the at least one light source identified based on the first color information.

15. The method of claim 9, wherein generating the second color information comprises:

sampling the second image information to extract a second frame;

dividing the second frame into a plurality of areas;

determining a representative color for each of the plurality of areas; and generating the second color information by including the representative color for each of the plurality of areas.

16. The method of claim 15, further comprising:

identifying an area corresponding to each of the plurality of light sources based on a location of the mobile device and a location of each of the plurality of light sources; and controlling the lighting module such that each of the plurality of light sources outputs light having the representative color of the area corresponding to each of the plurality of light sources.

* * * * *